No. 616,559. Patented Dec. 27, 1898.
J. A. N. & C. B. H. RASMUSSEN.
DRIVING GEAR FOR CHAINLESS CYCLES.
(Application filed Mar. 14, 1898.)

(No Model.)

United States Patent Office.

JULIUS ALEXANDER NICOLAJ RASMUSSEN AND CHARLES BENTON HART RASMUSSEN, OF COPENHAGEN, DENMARK.

DRIVING-GEAR FOR CHAINLESS CYCLES.

SPECIFICATION forming part of Letters Patent No. 616,559, dated December 27, 1898.

Application filed March 14, 1898. Serial No. 673,813. (No model.)

*To all whom it may concern:*

Be it known that we, JULIUS ALEXANDER NICOLAJ RASMUSSEN and CHARLES BENTON HART RASMUSSEN, of Copenhagen, Denmark, have invented a certain new and useful Improvement in Driving-Gears for Chainless Cycles, which improvement is fully set forth in the following specification.

In velocipedes in which the transmission of the motive power is effected by bevel-gears instead of by the ordinary chain-gear efforts have been made to reduce the friction either by the employment of very fine bevel-wheels, the shape of the teeth being as mathematically accurate as possible, or by causing the pinion to rotate in ball-bearings or round a bolt placed through two walls. None of these arrangements, however, entirely obviate friction arising from the slight shifting in the bearings, which is unavoidable during the working of the machine.

The present invention consists in a driving-gear for chainless cycles in which the teeth of the wheels are made of such a form that their accurate and free gearing is not affected by the above-mentioned shifting, as they only touch each other at points and not, as usual, in a line.

Figure 1:
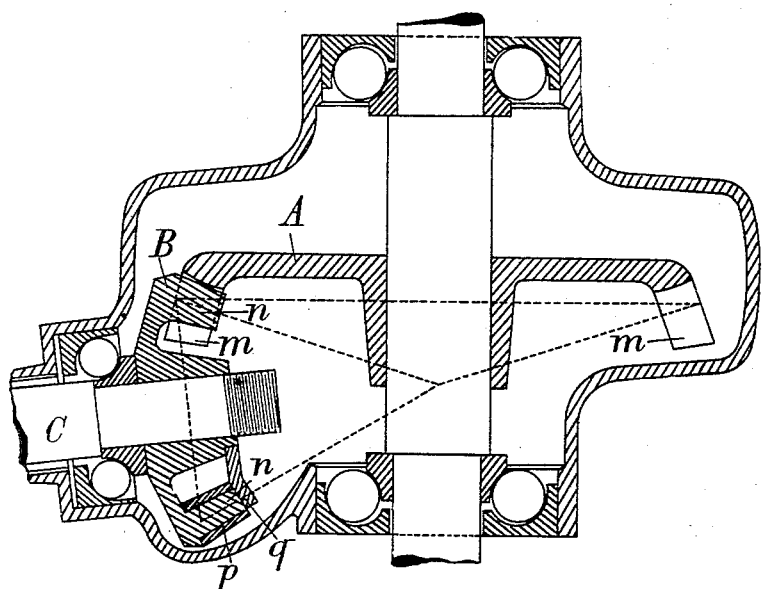
Figure 2:
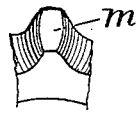
Figures 3, 4, 5:
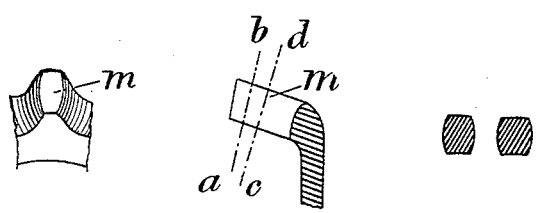

In the accompanying drawings, Figure 1 shows a horizontal section through the crank-shaft bearing of a cycle constructed according to the present invention. Fig. 2 shows a perspective view of part of the specially-formed driving-wheel. Fig. 3 is a section through the wheel between two teeth. Figs. 4 and 5 are sections on the lines $a\ b$ and $c\ d$ of Fig. 3, respectively; and Fig. 6 is a perspective view of part of the specially-formed pinion.

Figure 6:
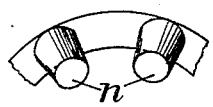

As will be seen from Figs. 2, 4, and 5, the teeth $m$ of the driving-wheel A are so made that their transverse section is limited by convex curves on the sides, while the teeth $n$ of the pinion B, Fig. 6, are each made in the form of a frustum of a cone cut out of the wheel itself. The ordinary lines of contact between the wheel and the pinion-teeth will then be reduced to points of contact, and the slight shifting of the axles or bearing during the working will not add to the friction. The teeth of the pinion being furthermore cut out of the wheel itself, the division of the teeth may be brought about with an accuracy corresponding to the division-plate. The arrangement described offers in this respect a great advantage compared with the above-mentioned formerly-adopted means, as the drilling of holes, the screw-cutting for the ball-cups, and the like prevent a similar accuracy in the division of the teeth.

To spread and diminish the wear of the conical teeth $n$ of the pinion, they may be inserted in sockets $p$, Fig. 1, of tempered steel, kept in their place by means of a common disk $q$, placed on the wheel-nave. From the crank-axle the motion is transmitted by the above-described wheels A and B to the driving-shaft C and, further, to the axle of the rear wheel by a gearing similar to the one above described.

Having now particularly described and ascertained the nature of our said invention and in what manner the same is to be applied, we declare that what we claim is—

1. In a driving-gear for chainless cycles, the combination with the crank-axle and the driving-shaft, of a bevel-gear on the crank-axle having teeth the acting faces of which are convexly curved in a transverse direction, and a bevel-pinion on the end of the driving-shaft having teeth of conical form, substantially as described.

2. In a driving-gear for chainless cycles, the combination with the crank-axle and the driving-shaft, of a bevel-gear on the crank-axle having teeth the acting faces of which are convexly curved in a transverse direction, a bevel-pinion on the end of the driving-shaft having teeth of conical form, sockets of conical form one on each of said teeth, and a plate for holding all of said sockets in place on their teeth, substantially as described.

In testimony that we claim the foregoing as our invention we have signed our names in presence of two subscribing witnesses.

JULIUS ALEXANDER NICOLAJ RASMUSSEN.
CHARLES BENTON HART RASMUSSEN.

Witnesses:
J. G. BRUNCHMANN,
SIGURD CHRISTENSEN.